Nov. 25, 1969     J. K. VALUS     3,479,906

TUNED FRICTION DAMPER

Filed April 12, 1967

INVENTOR.
James K. Valus
BY
Robert J. Outland
ATTORNEY

United States Patent Office 3,479,906
Patented Nov. 25, 1969

3,479,906
TUNED FRICTION DAMPER
James K. Valus, La Grange Park, Ill., assignor to General Motors Corporation, Detroit, Mich., a corporation of Delaware
Filed Apr. 12, 1967, Ser. No. 630,316
Int. Cl. F16f 16/12
U.S. Cl. 74—574                                              7 Claims

ABSTRACT OF THE DISCLOSURE

A tuned friction damper adapted for mounting on the interior of an internal combustion engine adjacent the end of the crankshaft to damp torsional vibrations therein, the damper including a pair of annular inertia members movably carried on a crankshaft mounted hub and resiliently driven by coil spring means between the hub and the inertia members. Pressure oil lubricated friction plates carried on the inertia members engage annular hub surfaces to damp oscillatory motions of the hub, the damping force being created by adjustable spring clamping means acting between the annular inertia members.

---

Figures 1, 2:
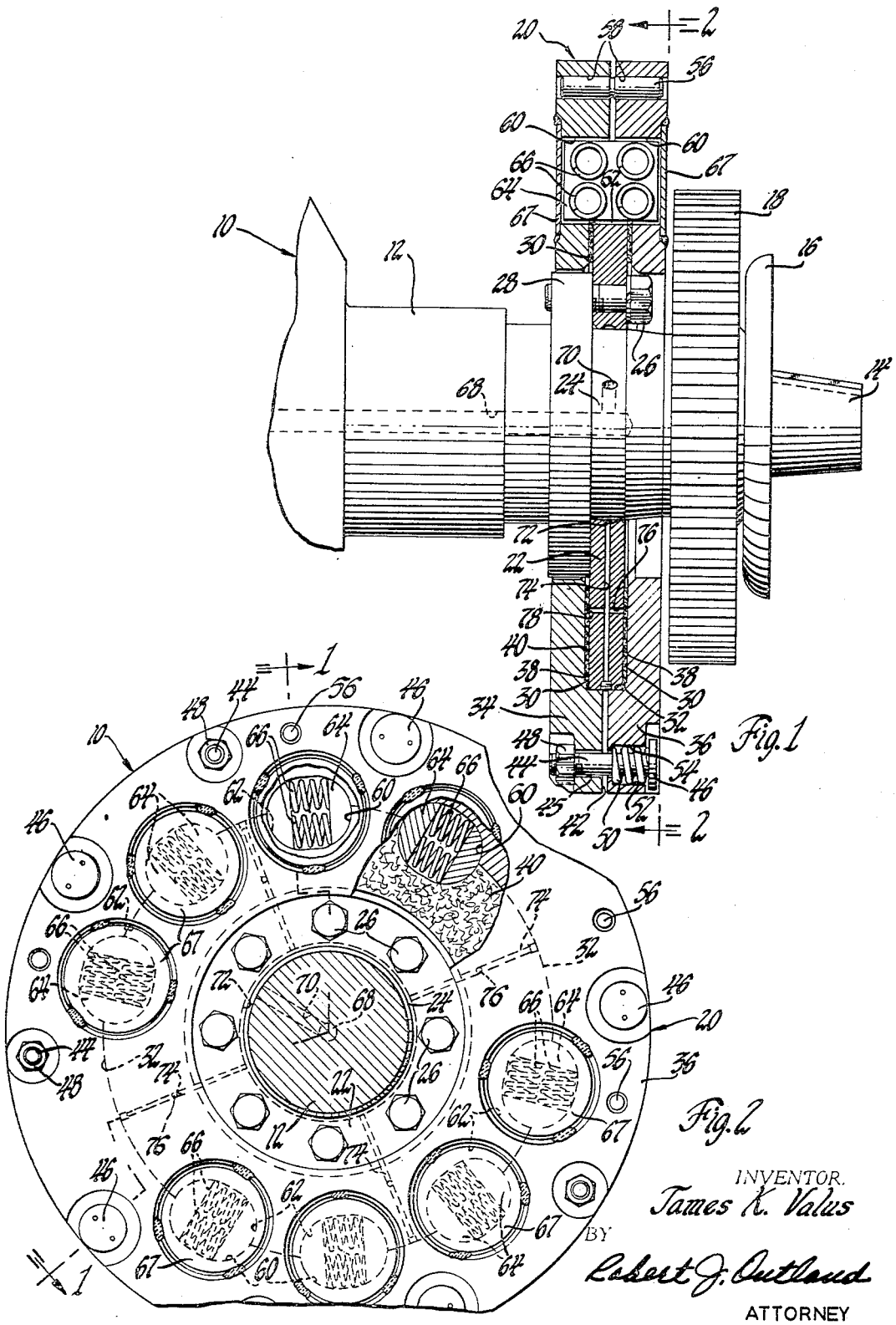

This invention relates to vibration dampers and, more particularly, to torsional vibration dampers of the tuned friction type.

It is a well-known practice to utilize a torsional vibration damper on the crankshaft of an internal combustion engine to dampen excessive torsional vibration which, particularly at certain critical operating speeds depending upon the engine construction, might otherwise lead to failure of the crankshaft or damage to the moving parts of the engine.

Many type of such dampers have been used, one of the types in common use on internal combustion engines being that known as a tuned friction damper. In this type, an inertia member is mounted on the end of the crankshaft and is resiliently driven so as to permit limited oscillatory motion of the inertia member with respect to the crankshaft. The rate of the resilient drive is selected to provide a desired vibration frequency for the damper and friction in the resilient drive or the mounting of the inertia member is commonly utilized to dampen torsional vibrations which cause relative motion between the inertia member and the crankshaft.

The prior constructions of tuned friction dampers have included those in which the inertia member is mounted on a rubber or other elastic element, such that the rubber provides both the resilient mounting for the inertia member and, through its own internal friction, the means for damping out torsional vibrations. In some such dampers, additional friction members are included to increase the damping effect. In another damper construction of the tuned friction type, the inertia member is resiliently driven by packs of leaf springs and the friction between the spring leaves is utilized to produce the damping effect.

Although the above-described damper constructions have been suitable for particular applications, those in which an elastic member is utilized have not generally been usable in locations where they will be exposed to attack by hot lubricants. It has, accordingly, been necessary to mount dampers of this type on a portion of the engine crankshaft extending outside of the engine crankcase and the lubricant spaces connecting therewith. Thus, where additional friction devices are utilized, the advantage of utilizing the engine lubricant to increase the life of the friction elements is not available with this construction. In addition, although dampers utilizing the spring-pack drive can be installed in an oily atmosphere, the design of these dampers must be a compromise between the desirable values of spring rate and friction and the necessity to design the spring packs to avoid excessive wear and breakage of the leaves.

The present invention provides a tuned friction damper construction which is suitable for heavy duty applications and yet solves many of the foregoing problems in an efficient and economical manner. A radially extending hub is provided which mounts on or adjacent the end of the engine crankshaft but may be located within a lubricant containing end housing of the engine. A pair of annular inertia members are carried on the periphery of the hub and retain oil resistant friction members which are clamped against opposite friction developing surfaces of the hub to provide the necessary damping. Adjustable resilient clamping means provide for selective adjustment of the force on the friction damping members. Coil spring drive means, which are separate from the friction developing means and have no significant internal friction, are arranged between the hub and the inertia members to provide a resilient connection between them. The rate of the coil spring drive means is selected so as to provide with the inertia members a predetermined natural frequency for the damper.

This arrangement provides a maximum of freedom in design and use of the damper construction in that the functions of resilient drive and friction damping are completely separated, permitting the independent modification of these variables as necessary for use in a particular application. In addition, the arrangement includes lubrication passages in the hub by means of which pressure lubricating oil may be distributed to the friction surfaces so as to give the best possible wear conditions and assure long life of the tuned friction damper.

Further advantages of invention will be more clearly understood from the following description of a specific embodiment selected for purposes of illustration and wherein, referring to the drawings:

FIGURE 1 illustrates a fragmentary view of an internal combustion engine crankshaft mounting a tuned friction damper according to the invention, and FIGURE 2 illustrates a cross-sectional view taken generally along the line 2—2 of FIGURE 1 and partially broken away to show certain details of the damper construction.

Referring now more specifically to the figures of the drawing, numeral 10 generally indicates a portion of an internal combustion engine crankshaft assembly including a crankshaft 12 carrying adjacent its outer end 14 an oil slinger 16, an accessory drive gear 18 and a tuned friction damper according to the present invention and generally indicated by numeral 20. Oil slinger 16, gear 18 and damper 20 are adapted to be located in an enclosed portion of an engine which houses accessory gear trains (not shown) and to be exposed to the lubricating oil utilized for lubricating the various moving parts of the engine.

Damper 20 is, however, mounted separately from the oil singer 16 and gear 18 and comprises a radially extending hub 22 which fits snugly over a mounting diameter 24 of the crankshaft and is secured by bolts 26 against a flange 28 integral with the shaft 12 and adjacent diameter 24.

Hub 22 extends radially outboard of flange 28 and includes oppositely facing annular surfaces 30, terminating at its outer diameter 32 on which are movably mounted a pair of annular inertia members 34, 36. The inertia members extend inwardly to a diameter slightly larger than that of flange 28 and retain on inner faces 38 annular friction plates 40 formed of a suitable oil-resistant, preferably nonmetallic material. The inner surfaces of friction plates 40 are forced into engagement with annular surfaces 30 of hub 22 in a manner to be subsequently described so as to develop friction therebetween.

Inertia members 34, 36 are spaced apart slightly as at 42 and are secured together at intervals around their periphery by means of bolts 44 extending through openings 45, having flat heads 46 and threadably retaining at their other ends nuts 48. Coil springs 50 are carried on bolts 44 within recesses 52 of inertia member 36, the springs being compressed between the undersides of head 46 and the lower surfaces 54 of recesses 52, such that they bias inertia members 34 and 36 toward one another and force friction plates 40 into engagement with surfaces 30 of the hub member. This engaging force is adjustable as desired by adjustment of nuts 48 on bolts 44 to obtain any desired compression of springs 50.

Inertia members 34, 36 are angularly indexed by dowel pins 56 which extend into mating bores 58 of the inertia members and are arranged to be a press fit in one of the bores and a loose fit in the other so that free, relative axial motion of the inertia members is permitted.

Annularly spacd about the inertia members and extending axially therethrough so as to overlap the periphery of hub member 22, are a plurality of oblong pocket-like openings 60 which are longitudinally aligned with corresponding pocket portions 62 in the outer portions of the hub member 22. In each of the pockets are retained, in angularly opposed relation, a pair of segmentally-shaped shoe members 64 between each of which are compressed four coil spring members 66. The shoes 64 are biased by the springs into engagement with the edges of both inertia member pockets 60 and hub pocket portions 62 and thus relative oscillation between the hub and inertia members is opposed by the springs which are further compressed whenever such relative motion occurs. The pockets 60 are closed by cover plates 67 welded to inertia members 34, 36 so as to retain the shoes 64 and spring members 66 in assembly.

In order to reduce wear of the friction plates to a minimum, provision is made for lubricating them with the engine oil supplied through an axial passage 68 and connecting lateral passage 70 in the crankshaft which supply oil to an annular groove 72 of the hub and thence to radial passages 74 which are plugged at their outer ends but intersect longitudinal passages 76; these latter distribute oil directly to annular grooves 78 formed in the surfaces of friction plate 30 and which distribute the lubricant to the adjacent friction developing surfaces to thereby reduce wear.

From the foregoing description, it should be apparent that when torsional vibration occurs in the crankshaft 12, hub 22 is caused to oscillate relative to the more constant rotation of inertia members 34, 36. This oscillation is first resisted by the additional compression of coil springs 66 which are selected so as to most strongly oppose vibrations at critical engine speeds. Secondly, the torsional vibrations are damped by the friction developed between hub surfaces 30 and friction plates 40, the amount of damping being adjustable by adjustment of nuts 48 to change the tension on springs 50. Wear of the friction surfaces is kept to a minimum by lubrication with pressure oil delivered from the crankshaft through hub passages 72, 74, 76 to grooves 78 in the friction plates 40.

From the foregoing description of a preferred embodiment, my invention is seen to comprise a tuned friction damper incorporating improvements in design and construction which render the device flexible in its application to varying torsional systems, permit its use within the enclosed lubricated portions of an engine and provide for lubrication of the friction surfaces as well as adjustment of the friction values to give a long lasting construction of unusual versatility. It should be obvious that the inventive concepts disclosed herein could be utilized in varying forms within the scope of the invention as disclosed and, accordingly, the scope of the invention is intended to be limited only by the language of the following claims.

I claim:

1. A tuned friction type torsional vibration damper for use on the crankshaft of an internal combustion engine, said vibration damper comprising
   a hub adapted to be fixedly secured to such crankshaft,
   annular inertia means rotatably carried on said hub and concentric therewith
   coil spring means arranged to provide a resilient driving connection between said inertia means and said hub, said spring means being substantially undamped and of a predetermined rate matched to said inertia means to provide a desired natural frequency of oscillatory vibration of said inertia means on said hub,
   friction damping means separate from said spring means and acting between said inertia means and said hub to provide frictional resistance to relative movement of said inertia means on said hub and
   means to adjust the force of friction developed by said friction damping means whereby a desired amount of friction damping may be selected.

2. A torsional vibration damper as defined in claim 1 wherein said friction damping means comprise friction plates formed of an oil resistant material, said damper including means to provide pressure lubrication of said friction plates to increase the usable life of said damper.

3. A tuned friction type torsional vibration damper for use on the crankshaft of an internal combustion engine, said vibration damper comprising
   a radially extending hub having an inner portion adapted to be secured to such crankshaft and an outer portion having opposed outwardly facing annular friction surfaces,
   a pair of annular inertia members carried on the outer periphery of said hub and each carrying friction means in engagment with one of said annular surfaces,
   resilient means acting between said inertia members and urging with a preselected force said friction means against said friction surfaces to provide friction damping of relative movement,
   means to adjust the force exerted by said resilient means whereby a desired amount of friction damping may be selected and
   coil spring means arranged to provide a resilient driving connection between said inertia members and said hub, said spring means being substantially undamped and of a predetermined rate matched to said inertia means to provide a desired natural frequency of oscillatory vibration of said inertia means on said hub.

4. A torsional vibration damper as defined in claim 3 wherein said inertia members and said hub coact to define a plurality of pockets extending through said hub and at least partly through said inertia members along the periphery of said hub and said coil spring means include,
   a pair of shoe members angularly oppositely received in each of said pockets and engageable by said hub and said inertia members whereby relative angular motion of said hub and said inertia members moves the shoes of each pair toward one another and
   a plurality of coil springs compressed between each pair of shoe members and urging them apart whereby relative angular motion of said inertia members on said hub is resiliently resisted.

5. A torsional vibration damper as defined in claim 3 wherein said friction means comprise oil resistant annular plates each having an anular oil groove in its hub engaging surface and said hub includes internal lubrication passages extending between said crankshaft and said oil groove whereby lubricating oil delivered under pressure from said crankshaft may be delivered to said friction plates.

6. A torsional vibration damper as defined in claim 4 wherein said friction means comprise oil resistant annular plates each having an annular oil groove in its hub engaging surface and said hub includes internal lubrication passages extending between said crankshaft and said oil groove whereby lubricating oil delivered under pressure from said crankshaft may be delivered to said friction plates.

7. A torsional vibration damper as defined in claim 6 wherein said annular inertia members include a plurality of mating openings extending axially through said members adjacent their peripheries and having headed bolts extending through said mating openings, said resilient means comprising a coil spring on each bolt and extending between the head thereof and the adjacent inertia member and said force adjusting means comprising a nut adjustably threaded on the end of each bolt opposite said head and engaging the other of said inertia members.

References Cited

UNITED STATES PATENTS 2,451,513   10/1948   Salomon _____ 74—574

FOREIGN PATENTS 305,527   11/1929   Great Britain.
307,921   10/1929   Great Britain.
435,594   12/1911   France.

FRED C. MATTERN, Jr., Primary Examiner
F. D. SHOEMAKER, Assistant Examiner